(12) United States Patent
Vossiek et al.

(10) Patent No.: US 12,416,717 B2
(45) Date of Patent: Sep. 16, 2025

(54) RADAR SYSTEM AND PROCEDURES FOR OPERATING A RADAR SYSTEM

(71) Applicant: SYMEO GMBH, Neubiberg (DE)

(72) Inventors: Martin Vossiek, Fürth (DE); Andreas Hofmann, Plankenfels (DE); Peter Gulden, Erding (DE); Mike Keaveney, Limerick (IE)

(73) Assignee: Symeo GmbH, Neubiberg (DE)

( * ) Notice: Subject to any disclaimer, the term of this patent is extended or adjusted under 35 U.S.C. 154(b) by 353 days.

(21) Appl. No.: 17/764,898

(22) PCT Filed: Aug. 11, 2020

(86) PCT No.: PCT/EP2020/072476
§ 371 (c)(1),
(2) Date: Mar. 29, 2022

(87) PCT Pub. No.: WO2021/063574
PCT Pub. Date: Apr. 8, 2021

(65) Prior Publication Data
US 2022/0350011 A1     Nov. 3, 2022

(30) Foreign Application Priority Data
Sep. 30, 2019  (DE) .................... 10 2019 126 352.2

(51) Int. Cl.
*G01S 13/58*   (2006.01)
*G01S 7/35*    (2006.01)

(52) U.S. Cl.
CPC .............. *G01S 13/584* (2013.01); *G01S 7/35* (2013.01)

(58) Field of Classification Search
CPC ................................ G01S 13/584; G01S 7/35
(Continued)

(56) References Cited

U.S. PATENT DOCUMENTS 8,872,674 B1 *  10/2014  Subramanya ........... G01S 13/00
                                                     340/939
2007/0081611 A1 *  4/2007  Fudge ..................... G01S 7/021
                                                     375/316
(Continued)

FOREIGN PATENT DOCUMENTS

CN       110927709 A  *  3/2020  ............. G01S 13/08
DE    102009016480 A1    10/2010
(Continued)

OTHER PUBLICATIONS

Alland et al, "Interference in Automotive Radar Systems," IEEE Signal Processing Magazine Digital Object Identifier 10.1109/MSP.2019.2908214, Date of publication: Sep. 9, 2019 (Year: 2019).*
(Continued)

*Primary Examiner* — William Kelleher
*Assistant Examiner* — Samarina Makhdoom
(74) *Attorney, Agent, or Firm* — Schwegman Lundberg & Woessner, P.A.

(57) ABSTRACT

The invention relates to a radar system, particularly a primary radar system, comprising at least one signal generating device (SGEN), which is configured to generate and to emit a transmit signal sequence, at least one signal detection device, which is configured to receive and to detect a receive signal sequence reflected on an object structure, at least one mixer (MIX) for mixing the receive signal sequence with the transmit signal sequence and for forming N baseband signals $s_b(n, t)$, where $n=1 \ldots N$, and at least one scanning device (ADC), which is configured to scan the N baseband signals at scanning frequencies $fs(n)$, wherein at least two, preferably at least three, further preferably all of the N scanning frequencies $fs(n)$ differ from each other.

17 Claims, 5 Drawing Sheets

(58) Field of Classification Search
USPC .......................................................... 342/109
See application file for complete search history.

(56) References Cited

U.S. PATENT DOCUMENTS

| | | | | |
|---|---|---|---|---|
| 2015/0285897 | A1* | 10/2015 | Kilty ....................... | G01S 7/285 |
| | | | | 342/201 |
| 2016/0124086 | A1* | 5/2016 | Jansen ................... | G01S 13/931 |
| | | | | 342/107 |
| 2019/0025405 | A1* | 1/2019 | Liu ......................... | G01S 7/4026 |
| 2019/0208112 | A1* | 7/2019 | Kleinbeck .............. | G08B 25/08 |

FOREIGN PATENT DOCUMENTS

| | | |
|---|---|---|
| DE | 102017223429 A1 | 7/2018 |
| EP | 3015880 A1 | 5/2016 |
| WO | WO-2020157039 A2 | 8/2020 |

OTHER PUBLICATIONS

European Patent Office, International Search Report and Written Opinion for PCT/EP2020/072476, May 15, 2021, 18 pages.

\* cited by examiner

RADAR SYSTEM AND PROCEDURES FOR OPERATING A RADAR SYSTEM

CROSS REFERENCE TO RELATED APPLICATIONS

This application is a U.S. National Phase application, filed under 35 U.S.C. § 371, of International Application No. PCT/EP2020/072476, filed Aug. 11, 2020, which claims priority to, and the benefit of foreign German Patent Application No. 102019126352.2 filed Sep. 30, 2019. The entire contents of which are incorporated herein by reference in their entireties.

DESCRIPTION

The invention relates to a radar system and a method for operating a radar system.

In particular, the invention relates to a method for generating, for detecting, and evaluating radar signals (or radio signal sequences), preferably with comparatively good orthogonality properties.

So-called chirp sequence FMCW radars, which are also called fast chirp FMCW radars or multi-ramp FMCW radars, are used today in a variety of forms, and a variety of embodiments of these radars are also known to those skilled in the art. The following references may be cited as exemplary publications: WOJTKIEWICZ, Andrzej, et al. *Two-dimensional signal processing in FMCW radars*. Proc. XX KKTOiUE, 1997, pp. 475-480; KRONAUGE, Matthias; ROHLING, Hermann. *New chirp sequence radar waveform*. IEEE Transactions on Aerospace and Electronic Systems, 2014, Vol. 50, No. 4, pp. 2870-2877; POUR VOYEUR, Klaus, et al. *Ramp sequence analysis to resolve multi target scenarios for a 77-GHz FMCW radar sensor*. In: 2008 11th International Conference on Information Fusion. IEEE, 2008. pp. 1-7; THURN, Karsten, et al. *Concept and implementation of a PLL-controlled interlaced chirp sequence radar for optimized range-Doppler measurements*. IEEE Transactions on Microwave Theory and Techniques, 2016, Vol. 64, No. 10, pp. 3280-3289; ROOS, Fabian, et al. *Enhancement of Doppler unambiguity for chirp-sequence modulated TDM-MIMO radars*. In: 2018 IEEE MTT S International Conference on Microwaves for Intelligent Mobility (ICMIM). IEEE, 2018. pp. 1-4.

Current automotive radars are often such chirp sequence FMCW radars. Chirp sequence FMCW radars have certain advantages. For example, they have a good resolution in both speed and distance dimensions. The speed dimension is also called Doppler dimension (because of Doppler frequency).

Even though a wide variety of embodiments and waveforms in chirp sequence FMCW radars is already known from the literature, one specific waveform is particularly commonly implemented. It is common that a signal sequence consists of a sequence of a number N of identical frequency-modulated signals, wherein the individual signals of the sequence are transmitted at equidistant time intervals. The advantage of this variant is that the received measured signals can be analyzed and/or processed very efficiently in terms of computing time with a fast Fourier transform or also a multi-dimensional fast Fourier transform in the distance and Doppler dimensions. This computationally efficient processing is less suitable if non-identical frequency modulated signals are used and/or if the time intervals between signals in a sequence are not equidistant.

A disadvantage of prior art chirp sequence FMCW radars is also that the scanning frequency in the Doppler dimension is determined by the reciprocal of the time interval between adjacent FMCW signals in a sequence. Since the duration of the FMCW signals (also called sweep duration) cannot be made arbitrarily short, both for reasons of hardware complexity and due to the requirements of the FMCW radar measurement principle, typical sweep durations are in the range from 10 microseconds to 10 milliseconds—only relatively low scanning rates in the Doppler dimension can be achieved. However, if the Doppler frequency generated by a moving target is greater than half the scanning rate in the Doppler dimension, so-called aliasing effects in this dimension or ambiguous results in target speed determination may occur.

One problem with chirp sequence FMCW radars, or indeed many other prior art radars, is that multiple radars can interfere with each other. This so-called interference problem has been described in many ways in the literature. The following references may be cited as exemplary publications: SCHIPPER, Tom, et al. *Discussion of the operating range of frequency modulated radars in the presence of interference*. International Journal of Microwave and Wireless Technologies, 2014, Vol. 6, No. 3-4, pp. 371-378; TOTH, Mate, et al. *Analytical Investigation of Non-Coherent Mutual FMCW Radar Interference*. In: 2018 15th European Radar Conference (EuRAD). IEEE, 2018. pp. 71-74; NAHMANN, Konstantin; SCHNEIDER, Stefan; ZWICK, Thomas. *Evaluation of probability of interference-related ghost targets in automotive radars*. In: 2018 IEEE MTT-S International Conference on Microwaves for Intelligent Mobility (ICMIM). IEEE, 2018. pp. 1-4.

One way to reduce this interference is not to use simple FMCW chirp sequences as radar signals, but to use coded signals such as OFDM signals, as described in SIT, Yoke Leen; ZWICK, Thomas. *MIMO OFDM radar with communication and interference cancellation features*. In: 2014 IEEE radar conference. IEEE, 2014. pp. 0265-0268; SCHWEIZER, Benedikt, et al. *Stepped-carrier OFDM-radar processing scheme to retrieve high-resolution range-velocity profile at low sampling rate*. IEEE Transactions on Microwave Theory and Techniques, 2018, Vol. 66, No. 3, pp. 1610-1618.

Another option is to additionally modulate or encode FMCW chirp sequences by phase or vector modulators to produce improved orthogonality properties or better cross-correlation properties. In general, the goal of all previously mentioned concepts is to minimize the correlation of two differently modulated signals. Signals that correspond well to this goal are also described as "signals with good correlation properties" or "signals with good orthogonality properties."

Signals with good correlation properties are also interesting for so-called MIMO radar systems (MIMO=multiple input multiple output). MIMO radars have multiple antennas for both transmitting and receiving. Today's MIMO radars operate in time division duplex (TDD) or time division multiplex (TDM) mode, i.e. the transmitters transmit one after the other, such that the transmitted signals from the multiple transmitting antennas do not interfere with each other or the echoes from multiple transmitted signals do not overlap in the received signals. If multiple signals overlap in the received signals, they can only be separated if the transmitted signals were orthogonally coded, i.e., transmitted signals with good correlation properties were used. Known examples of this are code division multiplexing (CDM) or frequency division multiplexing (FDM), e.g. the OFDM method mentioned above. In addition to the above-mentioned literature, such principles can be found, for example, in: Pfeffer, Clemens, et al. "*FMCW MIMO radar system for frequency-division multiple TX-beamforming*." IEEE Transactions on Microwave Theory and Techniques 61.12 (2013): 4262-4274; FEGER, Reinhard; PFEFFER, Clemens; STELZER, Andreas. *A frequency-division MIMO FMCW radar system based on delta-sigma modulated transmitters*. IEEE Transactions on Microwave Theory and Techniques, 2014, Vol. 62, No. 12, pp. 3572-3581; DE WIT, J. J. M.; VAN ROSSUM, W. L.; DE JONG, A. J. *Orthogonal waveforms for FMCW MIMO radar*. IEEE, 2011.

The disadvantage of using the vast majority of radar signals with good correlation properties known today is that both signal generation and, in particular, signal reception and signal processing in the receivers are complex and thus the power consumption and costs of such radar modules are comparatively high.

OFDM radars with modulation bandwidths of, for example, 1 GHz or 2 GHz, as is common today with chirp sequence FMCW radars, are currently hardly feasible in technical and commercial terms.

In principle, the solutions in the prior art are considered to be in need of improvement with regard to a result (in particular unambiguousness) of determinations (in particular target speed determinations) and also in particular with regard to efficient generation or processing of the radar signals used.

It is therefore the problem of the invention to propose a radar system as well as a corresponding method in which an improved (in particular as unambiguous as possible) determination of the respective parameter (in particular of a target velocity) is made possible in a comparatively efficient manner.

This problem is solved by the features listed in claim 1.

In particular, the problem is solved by a radar system, particularly a primary radar system, comprising at least one signal generating device, which is configured to generate (and particularly to emit) a transmit signal sequence, at least one signal detection device, which is configured to receive (and particularly to detect) a receive signal sequence reflected on an object structure, at least one mixer for mixing the receive signal sequence with the transmit signal sequence and for forming N baseband signals $s_b(n, t)$, where n=1 . . . N, and at least one scanning device, which is configured to scan the N baseband signals at scanning frequencies $f_s(n)$, wherein at least two, preferably at least three, further preferably all of the N scanning frequencies $f_s(n)$ differ from each other.

A scanning device means in particular a device which generates an (in particular digital) signal from the physically present continuous signal, which signal consists of a plurality (of for example at least 10 or at least 100) discrete signal values.

In particular, the scanning rate is the frequency at which individual discrete signal values are determined or specified.

Within at least one (in particular, within each) baseband signal, the scanning rate is preferably constant.

The scanning device may preferably be formed by or include an analog-to-digital converter (ADC).

A (the) analog-to-digital converter (ADC) may be provided to digitize the (respective) baseband signal $s_b(n, t)$, wherein the N digital baseband signals may be denoted $s_b(n, m)$.

The mixer may include a quadrature mixer (IQ or complex-valued mixer) and/or a real-valued mixer. The mixer may optionally be single-channel.

Furthermore, a filter (preferably low-pass filter) can be provided for filtering N downmixed signals $s_{mix}(n, t)$, wherein the baseband signals $s_b(n, t)$ are formed by the corresponding filtered signals.

Furthermore, a (digital) signal processing unit (DSPE), e.g. a microcontroller and/or microprocessor and/or a digital signal processor (DSP) and/or a field programmable gate array (FPGA), may be provided for processing the (digital) baseband signals.

Furthermore, a control unit (SE) with which, in particular, parameters of frequency-modulated signals, in particular the sweep rate, can be set and/or with which, if necessary, scanning frequencies $f_s(n)$ with which the (respective) baseband signal $s_b(n, t)$ is scanned can be set.

The baseband signal is preferably a downmixed (and preferably filtered) signal (comparison signal or mixed signal) from the (respective) receive signal sequence and the (respective) transmit signal sequence.

At least two, preferably at least three, further preferably at least five, still further preferably at least 10, still further preferably all, of the N scanning rates should differ from each other.

When N baseband signals are present (or used), preferably at least 25%, further preferably at least 50%, still further preferably at least 75% of the N scanning rates should differ from each other.

A scanning rate shall preferably be different from another (or all) other scanning rates if the (respective) other scanning rate has a different value. A plurality of scanning rates differing from each other shall mean in particular that all of the plurality (which may represent—see above—a subset of all scanning rates of all N baseband signals) are different from all other scanning rates of the considered plurality. Thus, for example, if at least three scanning rates differ from each other, this is specifically intended to mean that none of the three scanning rates may be identical to any other of the three scanning rates.

A (mean) difference of the scanning rates differing from each other is preferably at least 0.5%, if necessary at least 3% of a (mean, in particular in the arithmetic sense, mean) scanning rate (of the respective considered plurality of scanning rates, if necessary of all scanning rates of all baseband signals used).

In embodiments, at least two, preferably at least three, further preferably at least five of the N scanning rates may differ from the smallest scanning rate by at least 5%.

The smallest scanning rate can differ from the largest scanning rate (among all scanning rates or at least the plurality of different scanning rates), optionally by at least 10%, preferably at least 30%, from the value of the smallest scanning rate.

The (respective) transmitted or received signals are preferably ramp-shaped.

The number N of baseband signals is preferably at least three, further preferably at least ten, optionally at least 100.

In particular, a first idea of the invention is to implement different scanning rates. In this way, a comparatively good determination, in particular a determination that is as unambiguous as possible, of a parameter to be determined (in particular a target speed determination) can be made possible in an efficient manner.

According to a basically independent, but preferably more advanced, aspect, a (in particular the above) radar system comprises at least one signal generating device configured to generate (and in particular to transmit) a transmit signal sequence, and at least one signal detecting device, which is configured to receive (and in particular to detect) a signal sequence reflected on an object structure, wherein the transmit signal sequence comprises a number of N frequency-modulated, preferably linear frequency-modulated, radar signals $s_{Tx}$ with a respective sweep rate value $\mu(n)$, with n=1 N, wherein at least two, preferably at least three, further preferably all sweep rate values differ (in amount) from each other.

Preferably, each of the N radar signals is represented by a sweep start time $t_a(n)$ and a start frequency $f_{ca}(n)$ as well as a sweep end time $t_a(n)$ and end frequency $f_{ce}(n)$ and a sweep rate $\mu(n)$ and a sweep duration $T(n)$ (each with n=1 . . . N).

Wherein the sweep rate is defined as:

$$\mu(n) = \frac{2 \cdot \pi \cdot (f_{ce}(n) - f_{ca}(n))}{T(n)} \text{ with } T(n) = T_e(n) - T_a(n)$$

and the sweep bandwidth is defined as: $B(n)=|f_{ce}(n)-f_{ca}(n)|$.

Preferably at least two, further preferably at least three, still further preferably at least five, still further preferably at least 10, still further preferably all of the amounts of the sweep rate values differ from each other.

When N baseband signals are present (or used), preferably at least 25%, further preferably at least 50%, still further preferably at least 75% of the N sweep rate values should differ (in amount) from each other.

A plurality of sweep rate value amounts differing from each other is particularly intended to mean that all of the plurality (which may represent a subset of all sweep rate value amounts of all N baseband signals) are different from all other sweep rate value amounts of the considered plurality. Thus, for example, if at least three sweep rate value amounts differ from each other, this is particularly intended to mean that none of the three sweep rate value amounts may be identical to any other of the three sweep rate value amounts.

A (mean) difference of the sweep rate value amounts differing from each other is preferably at least 0.5%, if necessary at least 3% of a (mean, in particular, in the arithmetic sense mean) sweep rate value (of the respective considered plurality of sweep rate value amounts, optionally all sweep rate value amounts of all baseband signals used).

In embodiments, at least two, preferably at least three, further preferably at least five, of the N sweep rate value amounts may differ by at least 5% from the smallest sweep rate value amount.

The smallest sweep rate value amount may differ from the largest sweep rate value amount (among all sweep rate value amounts or at least the plurality of different sweep rate value amounts) by optionally by at least 10%, preferably at least 30%, from the value of the smallest sweep rate value amount.

Another idea of the invention is to provide or set several sweep rate values, differing in amount, for a plurality of radar signals. Such a measure can in particular contribute to a comparatively good (in particular comparatively unambiguous) determination of the respective parameter (in particular of a target velocity) in an efficient manner.

The values of B(n) or the range of values in which all $f_{ce}(n)$ and all $f_{ca}(n)$ are, are preferably (see also FIG. 2) the same for all sweeps. However, they can also be selected differently for each sweep (or at least for multiple sweeps).

Preferably, the scanning device is configured to scan the (respective) different scanning rates $f_s(n)$ by a different scanning clock, in particular directly during an analog-to-digital conversion. This results in a comparatively simple radar system.

The at least one scanning device may be configured to scan the different scanning rates $f_s(n)$ algorithmically by means of a scanning rate conversion, preferably for the case that the N baseband signals $s_b(n, t)$ have first been sampled by the scanning device (in particular an analog-to-digital converter) with a uniform scanning clock.

Preferably, the at least one scanning device is configured to set at least two, preferably at least three (more preferably at least five or at least 10 or at least 20), more preferably all, of the N scanning rates as a function of a modulation parameter (such as, in particular, a modulation speed, a sweep bandwidth, a sweep duration, and/or a sweep rate) such that they (i.e., the scanning rates) are proportional to the magnitude of the respective sweep rate $\mu(n)$.

The (respective) sweep (ramp) may be at least substantially linear.

Scanning times $t_s(n, m)$ are preferably selected (or the scanning device is preferably configured accordingly) such that the (corresponding) scanning points $s_b(n, m)$ with identical index m are assigned to an identical carrier frequency value $f_c(m)$.

The (respective) signal generating device is preferably configured such that at least one of two edge frequencies $f_{ca}(n)$, $f_{ce}(n)$ of at least one sweep is equal to at least one of two edge frequencies of at least one other, preferably several other (for example at least three or at least 10 other), further preferably all other, sweeps and/or lies within a sweep band of at least one other, preferably several other (for example at least three other or at least 10 other), further preferably all other, sweeps.

Alternatively or additionally, the signal generation device is configured such that a sweep bandwidth B(n) is the same for at least two, preferably at least three (for example, at least five or at least 10), further preferably all, sweeps.

Alternatively or additionally, the at least one signal generation device is configured such that sweep bands of at least two, preferably at least three (for example, at least five or at least 10), further preferably all, sweeps at least overlap, in particular are the same.

The signal generation device can be configured to generate at least one sweep rate value $\mu(n)$, in particular several or all sweep rate values $\mu(n)$ as random value(s) or pseudo-random value(s). This can improve the result of a corresponding radar determination (radar measurement), in particular comparatively good orthogonality properties can be achieved.

A respective sweep sequence is preferably different for at least two (further preferably for at least three, still further preferably for at least 10), in particular all, Doppler signals, preferably depending on a selection of sweep edge times $(t_a(n), t_e(n))$.

According to the embodiment, the evaluation device can be configured in such a way that M spectra $Sb_m(k)$ with K spectral values (k=1 to K) are calculated from M Doppler signals, in particular based on at least partially non-equidistantly scanned input values, wherein preferably multiple, in particular all M spectra at the same K discrete frequency base points k (k=1 to K) are calculated, and in a second step a total of K signals $Sb_k(m)$ are formed from these M spectra $Sb_m(k)$ from in each case all scanning points with the identical index k, wherein further preferably these K signals $Sb_k(m)$ (with m=1, 2, . . . , M) are subjected to a further spectral analysis and thus K spectra $Sb_k(j)$ (with j=1, 2, . . . , J) and/or a matrix with the values Sb(k, j) are/is formed, wherein the further spectral analysis is preferably a fast Fourier transformation (FFT), wherein a distance Doppler diagram is further preferably formed from this matrix with the values Sb(k, j), with which target objects are detected and a distance or speed is assigned to them.

The above-mentioned problem is in particular further solved by a radar method preferably using the radar system described above and/or hereinafter, comprising: Generating and emitting a transmit signal sequence, receiving and detecting a receive signal sequence reflected on an object structure, mixing the receive signal sequence with the transmit signal sequence and forming N baseband signals $s_b(n, t)$, with n=1 ... N, as well as scanning the N baseband signals with scanning rates $f_s(n)$, wherein at least two, preferably at least three, further preferably all, of the N scanning rates $f_s(n)$ differ from each other.

According to an independent, but preferably more advanced, aspect of the method, in particular a radar method, preferably a primary radar method, preferably of the above type and/or using the above radar system is proposed, comprising: Generating and emitting a transmit signal sequence, wherein the transmit signal sequence comprises a number of N frequency-modulated, preferably linear frequency-modulated, radar signals sTx with a respective sweep rate value $\mu(n)$, with n=1 ... N, wherein at least two, preferably at least three, further preferably all amounts of the sweep rate values differ from one another, and receiving and detecting a receive signal sequence reflected on an object structure.

Preferably, the radar method further comprises: Forming a number of M Doppler signals $sb_m(n, t)$ with N scanning points each from scanning points $s_b(n, m)$ of the baseband signals $s_b(n, t)$, wherein a distance of at least two, preferably at least three, further preferably all, scanning points $t_s(n, m)$ to a respective adjacent scanning point is preferably different.

Other features of the radar method result from the above (respective) radar system, in particular the functionalities and configurations explained there, which can be carried out as corresponding method steps.

The respective sweep duration (optionally arithmetically averaged in the case of several sweeps with varying sweep duration) is preferably at least 1 microsecond, further preferably at least 10 microseconds, optionally at least 100 microseconds and/or at most 100 milliseconds, preferably at most 10 milliseconds, optionally at most 1 millisecond.

In particular, the invention solves several problems of frequency-modulated continuous-wave radars, which are used today in large numbers, for example, as automotive radars and in many other applications in industry, robotics, household, remote sensing, and transportation.

Furthermore, the invention has the particular advantage of enabling computationally efficient processing even if signals are used that are not identically frequency modulated, or even if the time intervals between the signals in a sequence are not equidistant.

Furthermore, the invention has in particular the advantage that it allows an improved (unambiguous) target speed determination, even if FMCW signals with typical and technically well implementable sweep durations are used.

Furthermore, the invention particularly has at least the following advantages. Signal sequences are presented which have good correlation properties on the one hand, but can be efficiently generated and efficiently processed on the other. The radar signal sequences according to the invention are therefore particularly suitable for solving the interference problem described above. They also preferably allow simultaneous transmission on multiple channels in a MIMO radar.

The dependent claims disclose other advantageous embodiments.

The following description describes further principles, aspects, and embodiments of the invention, also with reference to the accompanying figures. Wherein.

In the description below, like reference numerals are used for like parts and parts having the same effect.

Figure 1:
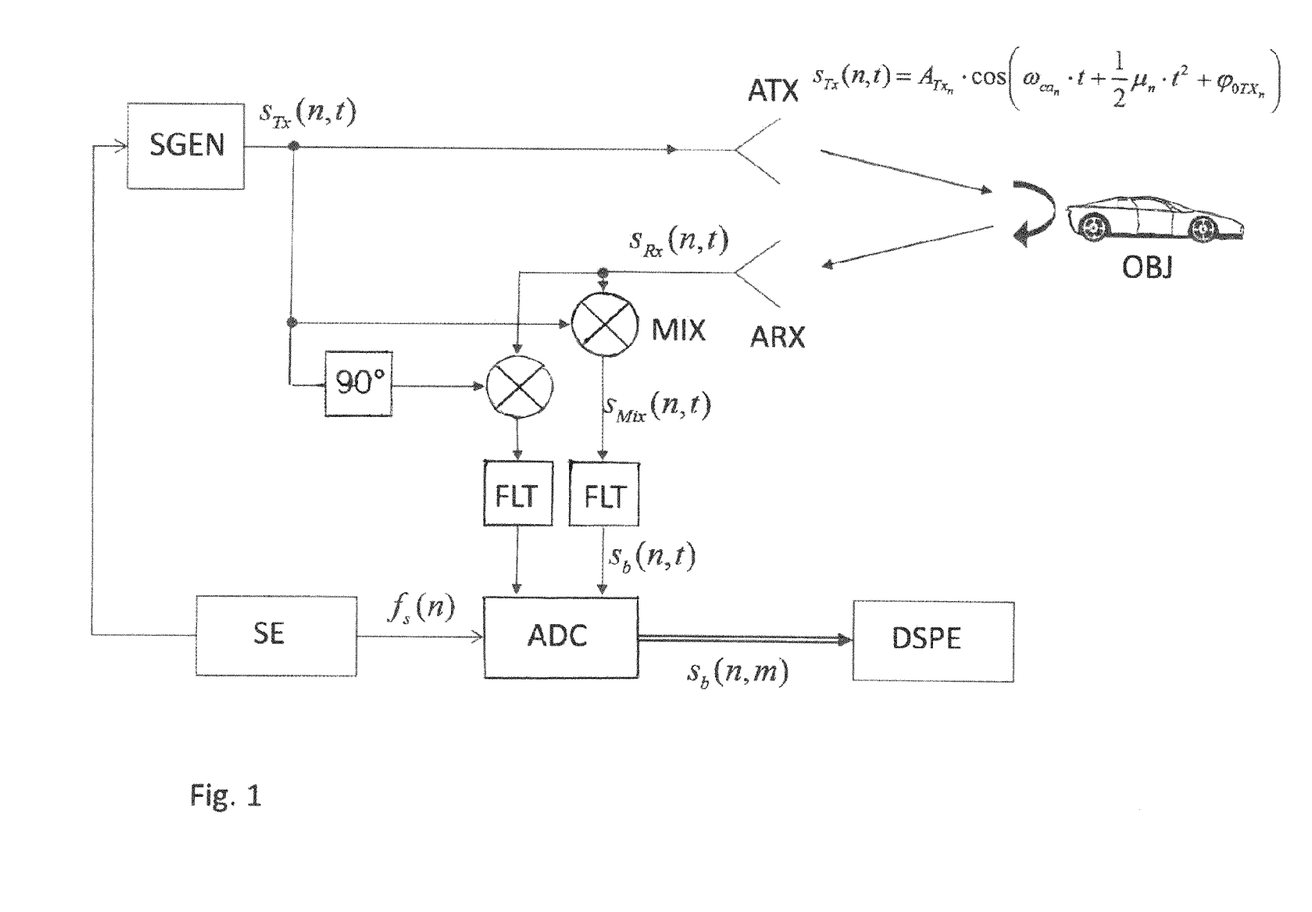
FIG. 1 shows a schematic representation of a radar system according to the invention.

Basic structure of the radar system:

The radar system suitable for the method according to the invention can correspond in large parts to the structure of a common chirp sequence FMCW radar system. FIG. 1 shows a block diagram of a possible arrangement (wherein: SGEN=signal generator; SE=control unit; ADC=analog-to-digital converter; MIX=mixer; FLT=filter; OBJ=object/object structure; DSPE=digital signal processing unit):

The system comprises a signal generator SGEN for generating frequency modulated signals or for generating a sequence of a number of N frequency modulated signals $s_{Tx}(n, t)$ with n=1, 2, ..., N, an antenna ATX for transmitting the signals $s_{Tx}(n, t)$ and an antenna ARX for receiving the reflected signals $s_{Rx}(n,t)$, wherein it is known to a person skilled in the art that it is also possible to use or configure one or more or all antennas both for transmitting and for receiving. The system further comprises a mixer MIX for mixing down the signal $s_{Rx}(n,t)$ with the signal $s_{Tx}(n, t)$, wherein it is generally known to a person skilled in the art that this mixer can be designed as a quadrature mixer (also called IQ mixer) as shown in the figure, but also as a single-channel real-valued mixer. In addition, a filter, preferably a low-pass filter, is used to filter the N downmixed signals $s_{mix}(n, t)$, wherein the filtered signals are called baseband signals $s_b(n,t)$. The system further comprises an analog-to-digital converter ADC for digitizing the baseband signal $s_b(n,t)$, wherein the N digital baseband signals are called $s_b(n,m)$, a digital signal processing unit DSPE, e.g. a microcontroller and/or microprocessor, a digital signal processor DSP, or a field programmable gate array FPGA, for processing the digital baseband signals, a control unit SE with which, the parameters of the frequency-modulated signals, in particular their sweep rate, can be set, on the one hand, and the scanning frequencies $f_s(n)$ with which the respective baseband signal $s_b(n,t)$ is scanned can be set on the other hand.

According to the embodiment, means are provided with which the value of the scanning frequencies $f_s(n)$ is directly coupled to at least one modulation parameter, such as the modulation rate, or to the sweep duration, or to the sweep bandwidth, of the N frequency-modulated signals, such that in particular the N frequency-modulated signals are scanned in a sequence with different scanning frequencies $f_s(n)$.

The radar system thus comprises an arrangement for generating and emitting a transmit radar signal sequence in the direction of an object scene and an arrangement for receiving and detecting the radar signal sequence reflected on the object structure, wherein said transmit radar signal sequence comprises a number of N frequency-modulated, preferably linear frequency-modulated, radar signals $s_{Tx}(n,t)$ (with n=1 ... N), wherein each of the N radar signals is characterized by a sweep start time $t_a(n)$ and start frequency $f_{ca}(n)$ and a sweep end time $t_a(n)$ and end frequency $f_{ce}(n)$ and a sweep rate $\mu(n)$ and a sweep duration $T(n)$ (each with n=1 ... N).

Wherein the sweep rate is defined as:

$$\mu(n) = \frac{2 \cdot \pi \cdot (f_{ce}(n) - f_{ca}(n))}{T(n)} \text{ with } T(n) = T_e(n) - T_a(n)$$

and the sweep bandwidth is defined as: $B(n)=|f_{ce}(n)-f_{ca}(n)|$.

The N sweep rate values $\mu(n)$ of the frequency-modulated radar signals are not all equal with respect to their magnitudes and preferably all different. The N sweep rate values $\mu(n)$ are preferably selected from the two value intervals from $\mu_{min}$ to $\mu_{max}$ and from $-\mu_{max}$ to $-\mu_{min}$, wherein $\mu_{max}$ defines the amount of a maximum selected sweep rate and $\mu_{min}$ defines the amount of a minimum selected sweep rate.

The N sweep rate values $\mu(n)$ can be selected in such a way that different transmit radar signal sequences, each with a different set of N values of $\mu(n)$ are formed and these different signal sequences have good orthogonality properties.

Figure 2:
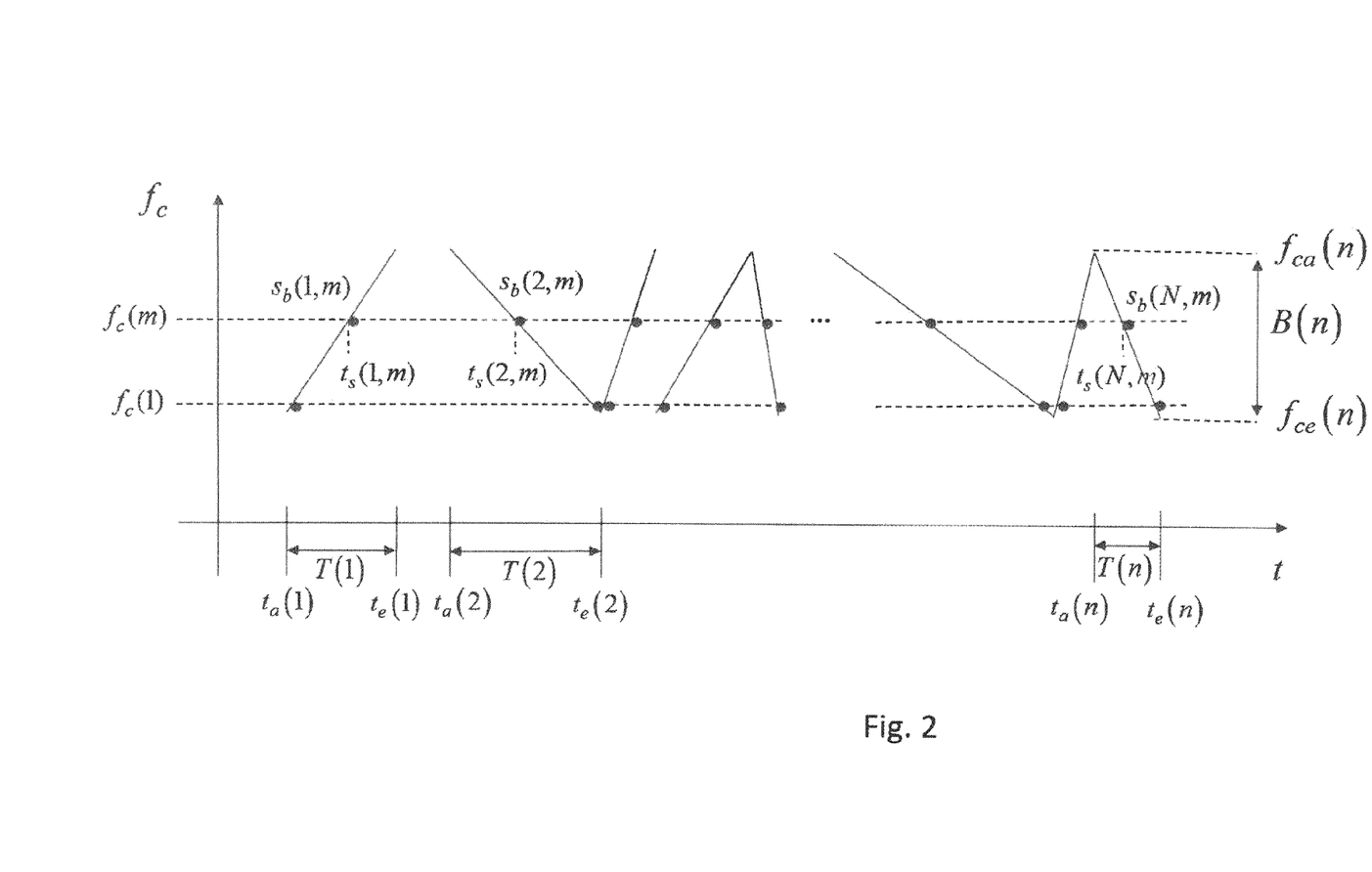
FIG. 2 shows an exemplary signal sequence.

FIG. 2 shows an exemplary sequence.

The values of $B(n)$ or the range of values in which all $f_{ce}(n)$ and all $f_{ca}(n)$ are preferably the same for all sweeps, as also shown in FIG. 2. However, they can also be selected differently for each sweep.

An advantageous selection of N sweep rate values $\mu(n)$, is to select the values of $\mu(n)$ as random values or as pseudo-random values from the aforementioned intervals, since this results in radar signal sequences with good orthogonality properties. In particular, two radar signal sequences have good correlation properties or good orthogonality properties if the N sweep rate values $\mu(n)$ in the two sequences differ as much as possible, e.g., if the sweep rate values are selected randomly distributed in the above intervals.

If two or more such signal sequences are mixed together (which can happen naturally in the present radar system in the receiver when several signal sequences are received simultaneously), the mixing products (i.e., the interference products) are statistically distributed almost uniformly over a broadband frequency range that may be determined by the selected sweep bandwidth.

A filter FLT preferably allows the desired baseband signal and also only that part of the interfering mixing products to pass that fall exactly within the frequency band or baseband defined by the filter FLT. However, since most of the interfering mixed products are outside the filter bandwidth, the interfering components can be significantly suppressed. If the design of two or more radar signals succeeds in such a way that, when the signals are correlated, their correlation products are statistically distributed over the maximum available bandwidth, the signals are optimal or at least improved with respect to their orthogonality properties or correlation properties.

The above signal sequences can be processed comparatively easily using the following steps.

Preferably (as above), the radar system comprises an arrangement for detecting a reflected radar signal sequence, with an antenna with which the reflected radar signal sequence is received and thus a receive radar signal sequence is formed, with a mixer MIX with which the receive radar signal sequence is mixed with the transmit radar signal sequence and thus N baseband signals $s_b(n,t)$ are formed, and these N baseband signals are scanned with an analog-to-digital converter (ADC) and then further processed as a digital signal $s_b(n, m)$.

As already partly explained before, N baseband signals $s_b(n, t)$ of a radar signal sequence from the analog-to-digital converter (ADC) with N different scanning rates $f_s(n)$ and the N values of the scanning rates $f_s(n)$ are selected to be proportional to the magnitude of the respective sweep rate $\mu(n)$.

Preferably, the scanning times $t_s(n,m)$ are chosen in such a way that the scanning points $s_b(n,m)$ with an identical index m have an identical carrier frequency value $f_c(m)$ (see FIG. 2).

By varying the scanning rates, it can be made possible that all (or at least a subset of the) scanned N baseband signals $s_b(n, m)$ have (exactly) the same number of scanning points in both dimensions despite their different time durations (which are determined by the respective sweep duration).

The N individual signals, formed from the scanning points $sb_n(m)=[s_b(n,1), s_b(n,2), \ldots, s_b(n,M),]$, correspond to the signals of common FMCW radars and could also be processed by common Fourier transform or other spectral analysis techniques to determine the distance and speed to a target. However, the usual two-dimensional processing of the baseband signal of a chirp sequence FMCW radar is not necessarily directly applicable because the scanning is not equidistant in the Doppler dimension.

The M individual signals in Doppler dimension direction are calculated from the sample points $sb_m(n)=[s_b(1,m), s_b(2,m), \ldots, s_b(N,m)]$ and, as can be seen in FIG. 2, each of these M signals is scanned non-equidistantly with a different scanning sequence.

This property, which at first appears to be a disadvantage, however, has an advantage with regard to the uniqueness range of the Doppler or speed measurement, as will be explained below. The following is a two-dimensional processing of the digital baseband signal according to the invention $s_b(n, m)$, which is particularly advantageous.

From the sample points $s_b(n, m)$, a number of M Doppler signals $sb_m(n)=[s_b(1,m), s_b(2,m), \ldots, s_b(N,m)]$ with N sample points each is formed, which is to be designated $sb_m(n)$ wherein the distance between adjacent scanning points is $[t_s(1,m), t_s(2,m), \ldots, t_s(N,m)]$ is not equal and the scanning sequence $[t_s(1, m), t_s(2,m), \ldots, t_s(N,m)]$ is therefore different for all M Doppler signals and the respective scanning sequence results from the choice of the sweep start times $t_a(n)$, the sweep start frequency $f_{ca}(n)$ the sweep end times $t_a(n)$ and the sweep end frequency $f_{ce}(n)$ (cf. FIG. 2);

M spectra $Sb_m(k)$ with K spectral values (k=1 to K) are first calculated from the M Doppler signals $sb_m(n)$, wherein the spectrum calculation is carried out using a method in which non-equidistantly scanned input values are permissible.

Advantageous methods that allow spectrum calculation with non-equidistantly scanned input values can be found, for example, in:

Tarczynski, A., & Allay, N. (2004). *Spectral analysis of randomly sampled signals: suppression of aliasing and sampler jitter*. IEEE Transactions on Signal Processing, 52(12), pp. 3324-3334.

Tropp, J. A., Laska, J. N., Duarte, M. F., Romberg, J. K, & Baraniuk, R. G. (2010). *Beyond Nyquist: Efficient sampling of sparse bandlimited signals*. IEEE Transactions on Information Theory, 56(1), pp. 520-544.

Zandieh, A., Zareian, A., Azghani, M., & Marvasti, F. (2019). *Reconstruction of sub-Nyquist random sampling for sparse and multi-band signals. arXiv preprint arXiv:* 1411.6587.

Preferably all M spectra $Sb_m(k)$ on the same K discrete frequency base points k(k=1 to K) are calculated and in a second step, a total of K signals $Sb_k(m)$ is calculated from these M spectra $Sb_m(k)$ from all scanning points with the identical index k, and these K signals $Sb_k(m)$ (with m=1, 2, ..., M) are subjected to another spectral analysis and thus K spectra $Sb_k(j)$ (with j=1, 2, ..., J) or a matrix with the values Sb(k, j) is formed.

The other spectral analysis can be a fast Fourier transformation (FFT).

A distance Doppler diagram can be formed from the matrix with the values Sb(k, j), with which diagram target objects are detected and a distance or speed is assigned to them.

It is known from the theory of spectral analysis with non-equidistantly scanned signals that the spectra of such signals, unlike those of equidistantly scanned signals, do not repeat periodically and, at favorable scanning frequencies, frequencies significantly higher than half the average scanning frequency can be estimated correctly and unambiguously. It is also known that scanning frequencies with statistically or randomly selected scanning times, as they can be present here in the Doppler dimension, are advantageously suited for unambiguous frequency estimation.

For this reason, in particular, a correct and unambiguous estimate of the speed of a radar target is made possible over a much wider range of uniqueness than would be possible with prior art chirp sequence FMCW radars with similar sweep rates and similar sequence durations. This is a great advantage especially for the use of such radars in the automotive, railroad or aviation sector or also for many other applications where objects with a wide range of possible speeds can be located in the detection range of a radar.

Methods in which the bandwidth is varied (along with the scanning rate) can give the same effect (although not necessarily with the advantages of extended Doppler range, but possibly with the advantages of a larger unambiguous range of distances; the two approaches can also be combined if necessary)

Since, as explained above, the signal sequences in particular also have good orthogonality properties or good correlation properties, they can also be used advantageously in MIMO radars to enable simultaneous transmission on multiple transmit channels.

Figure 3:
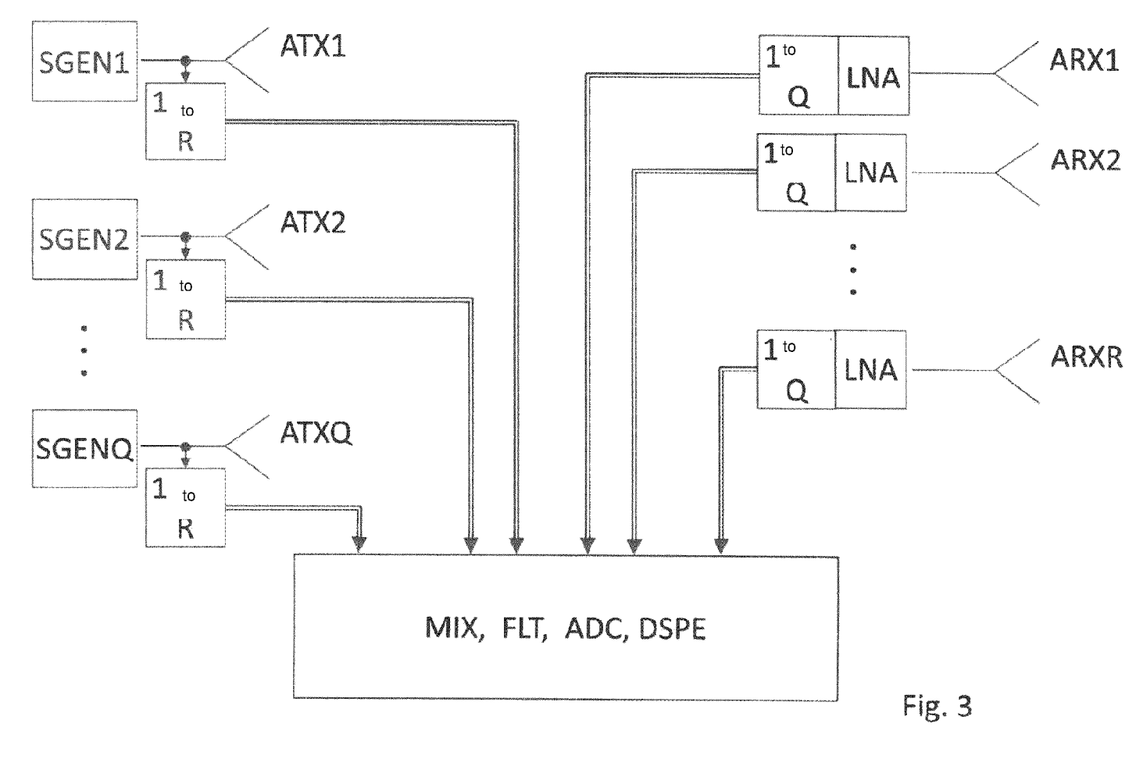
FIG. 3 shows another schematic representation of a radar system according to the invention.
Figure 4:
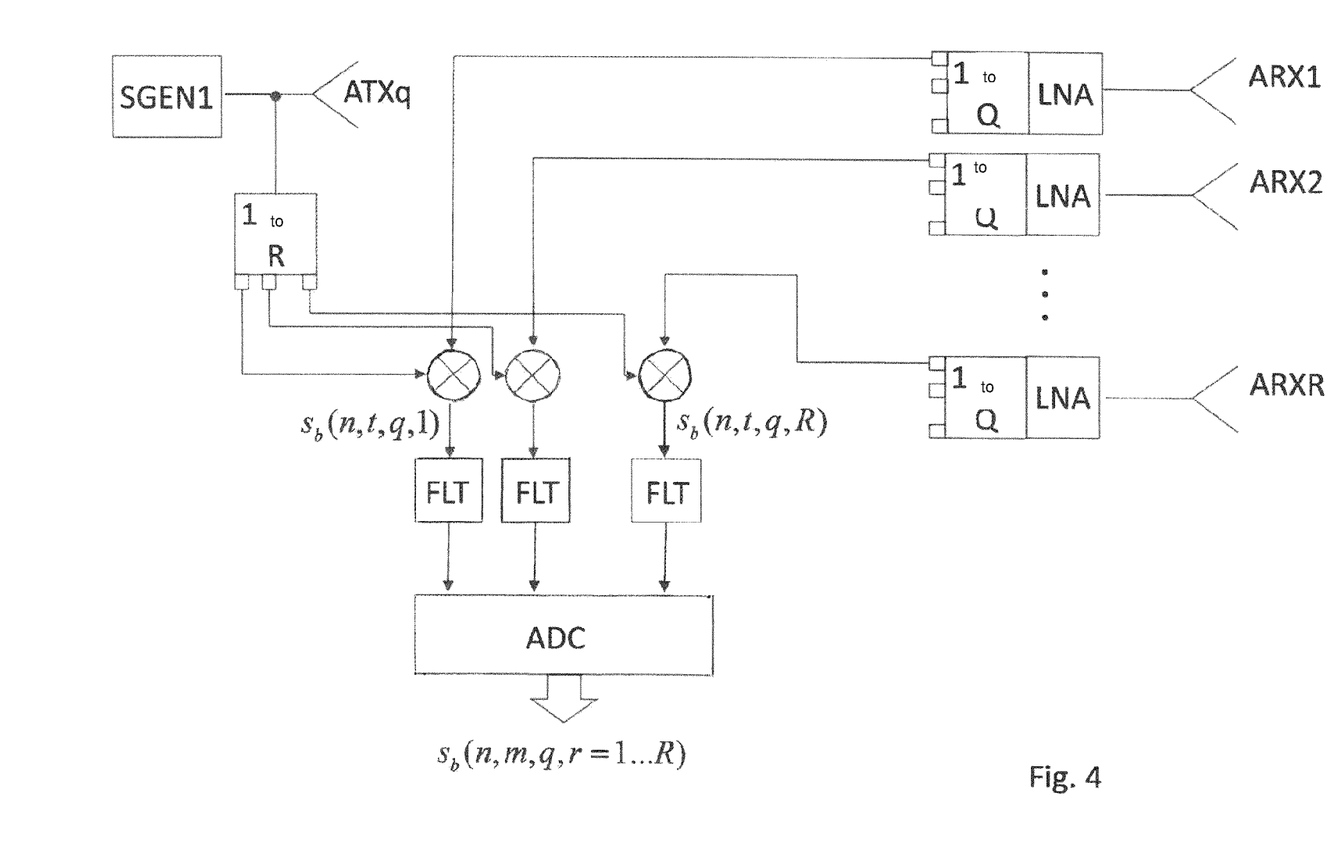
FIG. 4 shows another representation of a radar system according to the invention.
Figure 5:
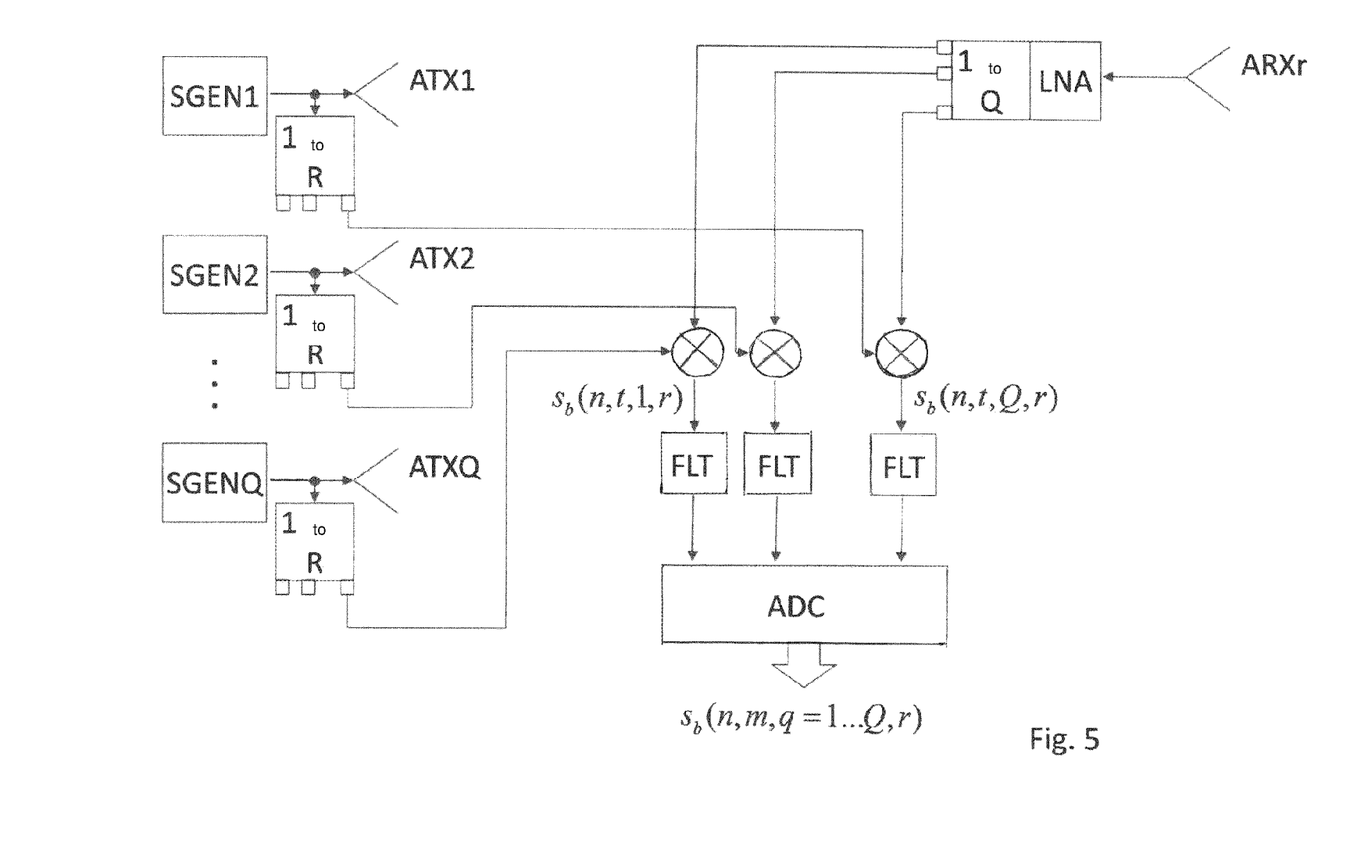
FIG. 5 shows another representation of a radar system according to the invention.

FIGS. 3, 4, and 5 illustrate one possible embodiment of such a radar.

The system comprises a number of Q signal generators (index q=1 ... Q) for generating the signal sequences according to the invention and Q antennas (index q=1 ... Q) for transmitting these signal sequences. The Q signal sequences are now all to be transmitted simultaneously. It is also conceivable to send only subgroups, i.e. a limited number, e.g. 2 or 3, of the Q signal sequences simultaneously, which could reduce the effort in the receiver, but is not crucial here. In accordance with embodiments, the transmitter circuit behind each of the Q signal generators is designed to distribute the transmit signal to a number of R paths using a signal divider (1 on R) adjacent to the path on which it is transmitted.

The embodiment further comprises a number of R receiving antennas (index r=1 ... R) for receiving the radar signals. According to the embodiment, the receiver circuit behind each of the R receiving antennas is designed in such a way that the receive signal is distributed to a number of Q paths using a signal divider (1 on Q).

The receiver circuit behind each of the R receiving antennas can be designed in such a way that the receive signal of a receiving antenna is fed to a number of Q mixers (or to as many mixers as signals were transmitted simultaneously). As the signal used for mixing down, the Q mixers are each fed with one of the Q signal sequences. The mixed signals are filtered with a filter FLT before further processing of the signals is performed.

FIG. 4 shows a sketch of a possible embodiment of a section of the complete circuit with only one of the transmit channels (here the transmit channel with the index q). The circuits for all other transmit channels can be designed in the same way.

FIG. 5 shows a sketch of a possible embodiment of a section of the overall circuit with only one of the receive channels (here the receive channel with the index r). The circuits for all other receive channels can be designed in the same way.

Finally, the receive signal of a receive antenna (index r) is mixed down with all Q signal sequences, filtered, scanned with an ADC, such that for each of the Q transmit channels R digital baseband signals $s_b(n,m,q,r=1 \ldots R)$ are formed for each of the R receive channels Q (cf. FIG. 4), or digital baseband signals $s_b(n,m, q=1 \ldots Q,r)$ are formed (cf. FIG. 5), i.e., ultimately a total of R times Q digital baseband signals $s_b(n, m, q=1 \ldots Q, r=1 \ldots R)$ are formed.

Due to the good orthogonality properties or the good correlation properties of the signal sequences according to the invention, only the signal components of one transmit signal at a time, and always of the one with which downmixing was performed, are strongly pronounced, and the others are strongly suppressed, in the Q distance Doppler diagrams which are formed from the Q mixed signals of a receive channel (i.e. those from one of the receive antennas). Thus, despite simultaneous transmission with multiple transmit signals, the resulting receive signals can be processed separately for each of the R by Q transmit-receive antenna combinations.

It is also possible to scan the R receive signals directly and perform the mixing processes in digitized form in a computing unit.

It should be noted at this point that all of the parts described above, considered on their own and in any combination, in particular the details shown in the drawings, are claimed as possibly also independent inventive ideas, in particular as respective independent further developments of the inventions shown in the claims. Amendments to this are possible.

The invention claimed is:

1. A radar system, particularly a primary radar system, comprising
   at least one signal generation device configured to generate and emit a transmit signal sequence,
   at least one signal detection device configured to receive and detect a receive signal sequence reflected on an object structure,
   at least one mixer for mixing the receive signal sequence with the transmit signal sequence and for forming N baseband signals; and
   at least one scanning device configured to sample the N baseband signals at N respective scanning rates to establish respective scanning points;
   wherein at least two of the N scanning rates differ from each other and are proportional to a corresponding magnitude of a sweep rate value of frequency modulation used in the transmit signal sequence;
wherein the at least one scanning device is configured such that scanning times corresponding to the respective scanning rates are selected such that respective scanning points from different scanning rates are associated with a same carrier frequency value; and
wherein at least some of the scanning points are not equidistant from each other in time.

2. The radar system according to claim 1; wherein the transmit signal sequence comprises a number of N frequency-modulated radar signals with respective sweep rate values; and
wherein the respective sweep rate values differ from each other.

3. The radar system according to claim 1; wherein the at least one scanning device is configured to implement the different scanning rates by a different scanning clock directly in an analog-to-digital conversion.

4. The radar system according to claim 1, wherein the at least one scanning device is configured to implement the different scanning rates algorithmically using scanning rate conversion; and
wherein the N baseband signals are sampled by an analog-to-digital converter (ADC) with a uniform scanning clock.

5. The radar system according to claim 1, wherein the at least one scanning device is configured to further adjust at least two of the N scanning rates as a function of a modulation parameter comprising at least one of a modulation speed, a sweep bandwidth, or a sweep duration.

6. The radar system according to claim 1, wherein the at least one signal generating device is configured such that at least one of two edge frequencies of at least one sweep is equal to at least one of two edge frequencies of at least one other sweep or lies within a sweep band of at least one other sweep.

7. The radar system of claim 6, wherein a sweep bandwidth is the same for at least two sweeps.

8. The radar system of claim 6, wherein sweep bands of at least two sweeps are identical.

9. The radar system according to claim 1, wherein the at least one signal generating device is configured to generate at least one sweep rate value randomly.

10. The radar system according to claim 1, comprising an evaluation device which is configured to form a number of M Doppler signals each having N scanning points, from the scanning points of the baseband signals;
wherein a distance between at least two scanning points and a respective adjacent scanning point are different.

11. The radar system according to claim 1, wherein a respective scanning sequence is different for at least two or more Doppler signals.

12. The radar system according to claim 1, comprising an evaluation device which is configured such that spectra $Sb_m(k)$ with K spectral values (k=1 to K) are calculated from M Doppler signals, based on at least partially non-equidistantly scanned input values,
wherein multiple M spectra at K discrete frequency base points k (k=1 to K) are calculated; and
wherein a total of K signals $Sb_k(m)$ are formed from the M spectra $Sb_m(k)$, in each case from all scanning points with index k;
wherein the K signals $Sb_k(m)$ (with m=1,2, ..., M) are subjected to another spectral analysis and K spectra $Sb_k(j)$ (with j=1,2, ..., J) comprising a matrix with the values Sb(k, j) are formed,
wherein the spectral analysis is a fast Fourier transformation (FFT), and
wherein a distance Doppler diagram is formed from a matrix with the values Sb(k, j).

13. A radar method, comprising:
generating and sending a transmit signal sequence,
receiving and detecting a receive signal sequence reflected on an object structure;
mixing the receive signal sequence with the transmit signal sequence and forming N baseband signals; and
sampling the N baseband signals at N respective scanning rates to establish respective scanning points,
wherein at least two of the N scanning rates differ from each other and are proportional to a corresponding magnitude of a sweep rate value of frequency modulation used in the transmit signal sequence,
wherein scanning times corresponding to the respective scanning rates are selected such that respective scanning points from different scanning rates are associated with a same carrier frequency value; and
wherein at least some of the scanning points are not equidistant from each other in time.

14. The radar method according to claim 13, wherein the transmit signal sequence comprises a number of N frequency-modulated radar signals with a respective sweep rate values,
wherein the respective sweep rate values differ from each other.

15. The radar method according to claim 13, comprising forming a number of M Doppler signals, each having N scanning points, from the scanning points of the baseband signals;
wherein a distance between at least two scanning points to a respective adjacent scanning point is different.

16. The radar method according to claim 13, wherein the scanning comprises further adjusting at least two of the N scanning rates as a function of a modulation parameter comprising at least one of a modulation speed, a sweep bandwidth, or a sweep duration.

17. The radar method according to claim 13, wherein the transmit signal sequence uses at least one of two edge frequencies of at least one sweep equal to at least one of two edge frequencies of at least one other sweep or lies within a sweep band of at least one other sweep.

* * * * *

UNITED STATES PATENT AND TRADEMARK OFFICE
CERTIFICATE OF CORRECTION

| | |
|---|---|
| PATENT NO. | : 12,416,717 B2 |
| APPLICATION NO. | : 17/764898 |
| DATED | : September 16, 2025 |
| INVENTOR(S) | : Vossiek et al. |

It is certified that error appears in the above-identified patent and that said Letters Patent is hereby corrected as shown below:

On the Title Page

In item (57), in Column 2, Line 11, delete "fs(n)," and insert --$f_s(n)$,-- therefor In item (57), in Column 2, Line 13, delete "fs(n)," and insert --$f_s(n)$,-- therefor In the Claims In Column 12, Lines 53-54, in Claim 1, delete "particularly a primary radar system, comprising" and insert --comprising:--

In Column 12, Line 56, in Claim 1, delete "sequence," and insert --sequence;-- therefor In Column 12, Line 59, in Claim 1, delete "structure," and insert --structure;-- therefor In Column 13, Line 10, in Claim 2, delete "claim 1;" and insert --claim 1,-- therefor In Column 13, Line 16, in Claim 2, delete "claim 1;" and insert --claim 1,-- therefor In Column 13, Line 41, in Claim 8, after "wherein", insert --a--

In Column 14, Line 12, in Claim 12, delete "formed," and insert --formed;-- therefor In Column 14, Line 14, in Claim 12, delete "(FFT)," and insert --(FFT);-- therefor In Column 14, Line 18, in Claim 13, delete "sequence," and insert --sequence;-- therefor In Column 14, Line 23, in Claim 13, delete "points," and insert --points;-- therefor Signed and Sealed this
Sixteenth Day of December, 2025

John A. Squires
*Director of the United States Patent and Trademark Office*

CERTIFICATE OF CORRECTION (continued)
U.S. Pat. No. 12,416,717 B2

In Column 14, Line 27, in Claim 13, delete "sequence," and insert --sequence;-- therefor In Column 14, Line 40, in Claim 15, after "comprising", insert --:--